United States Patent [19]
Sharkey et al.

[11] Patent Number: 5,504,717
[45] Date of Patent: Apr. 2, 1996

[54] SYSTEM FOR EFFECTIVE CONTROL OF URBAN ENVIRONMENT SECURITY

[75] Inventors: J. Brian Sharkey; Randy A. Doblar, both of Alexandria; Frank E. Bothwell, Falls Church, all of Va.; Ronald A. Belt, Plymouth, Minn.; Edward A. Page, Kensington, Md.

[73] Assignee: Alliant Techsystems Inc., Hopkins, Minn.

[21] Appl. No.: 250,743

[22] Filed: May 27, 1994

[51] Int. Cl.[6] ........................................ G01S 3/80
[52] U.S. Cl. ................ 367/124; 367/129; 367/906
[58] Field of Search ............................. 367/124, 129, 367/906, 118

[56] References Cited

U.S. PATENT DOCUMENTS

| | | | |
|---|---|---|---|
| 3,341,810 | 9/1967 | Wallen, Jr. | 367/124 |
| 4,091,366 | 5/1978 | Lavallee | 340/224 |
| 4,279,027 | 7/1981 | Van Sloun | 367/125 |

FOREIGN PATENT DOCUMENTS 9305960  8/1993  South Africa.

OTHER PUBLICATIONS

G.R.A.I.D.™ System By 3-I Inc., "Gunshot Reporting and Identification System", 3 pages, 3-I Inc., 5536-A Independence C, Punta Gorda, FL 33982.

"Gunfire Locater system South: Redwood City Residents Ask Police To Use SRI System", *San Jose Mercury News--Local,* Wednesday, Jan. 12, 1994.

Lahr, J. C. and F. G. Fischer, "Location of Acoustic Sources Using Seismological Techniques and Software", U.S. Department of the Interior, U.S. Geological Survey, Open--File Report 93-221.

*Primary Examiner*—Ian J. Lobo
*Attorney, Agent, or Firm*—Leone & Moffa

[57] ABSTRACT

A security system for detecting and reporting gunshot events for control of urban environment security which includes a communication link coupled to a plurality of pole units arranged in a dense grid. Each of the plurality of pole units includes a microphone, a data acquisition unit coupled to said microphone, a signal processor for discriminating gunshot events, and a communication interface apparatus coupled at an input to the signal processor. The communication interface also has an output coupled to the communication link, where the communication interface transmits and receives data on the communication link. A central processor is coupled to the communication link so as to receive data from and transmit data to the plurality of pole units. The central processor and the plurality of pole units operate so as to detect and locate gunshot events sensed by one or more of the plurality of pole units.

12 Claims, 9 Drawing Sheets

SYSTEM FOR EFFECTIVE CONTROL OF URBAN ENVIRONMENT SECURITY

FIELD OF THE INVENTION

The present invention relates to the field of urban environment security systems.

BACKGROUND OF THE INVENTION

Given the rise in gun related violence in urban areas and the increasing involvement of U.S. troops in worldwide peace keeping operations there now exists a need for a security system having capabilities to quickly detect, locate and classify the source of gunfire with a high degree of reliability and accuracy. The system should also provide rapid notification to local law enforcement authorities, rescue teams or military personnel, as the case may be, while aiding in locating gunshot victims and apprehension of perpetrators. Such a system must also be able to withstand the harsh environment of an urban setting or war zone, be inconspicuous, and require a minimum of maintenance while allowing for the easy placement and removal. The necessity for such an invention is premised on a long felt need for rapid response by police, peace keeping troops and rescue teams in order to significantly increase the apprehension rate of perpetrators and the survival rate of gunshot victims.

One known device, the G.R.A.I.D.™ by 3-I, Inc. is a gunshot detector for use in silent alarm devices. In one application, when a firearm is discharged, a detector activates hidden cameras and notifies either the police or an alarm company. In another application of the G.R.A.I.D.™ device, it is installed in the front grill of a police car whereby it can detect a gunshot near the vicinity of the police car by separating the profile of gunshot from that of other common noises. In a situation where a police officer is wounded by gunfire, or discharges his weapon, the G.R.A.I.D.™ device commences a sequence to summon aid by opening the police transmitter, generating a series of codes distinct to each car which is transmitted over police radio for two seconds and is repeated at one minute intervals until the system is reset. The transmission is received at the dispatch desk by decoding receiver where the transmission is converted into the number of the sending vehicle. The receiver sounds an alarm and displays the number of the sending vehicle with time and day. The receiver is reset and the vehicle contacted. If no contact is made with the transmitting vehicle the code will be repeated and the receiver will continue to trip once each minute. After five minutes, the vehicle's horn will sound for five seconds each minute to assist responding officers in locating the vehicle.

U.S. Pat. No. 3,341,810 to Wallen et al. entitled "Gunshot Detector System", teaches a system designed to function in an extreme ambient noise environment for detecting and distinguishing gunshot muzzle blasts and acoustic pressure waves of gun-launched projectiles passing in proximity to a target on which the system is mounted.

Wallen, et al. teaches a system wherein a plurality of detecting networks are placed on a high level ambient noise platform, such as a helicopter. Utilizing pressure waves generated from an object passing at high speed, in this case a bullet, the plurality of detecting networks is able to determine the range and distance of the source by calculating the intensity of the pressure wave, with muzzle indications provided only if the distance between the detecting site and the originating point of the report exceeds a predetermined amount. The Wallen et al. device determines and processes two disparate frequencies within the ultra-sonic range to reduce the effect of ambient noise. The location of the muzzle blast is provided only if the distance between the detecting site and the originating point of the report exceeds a predetermined amount.

Unfortunately, prior devices as discussed above have not proven especially effective in discriminating gunshot events from other types of similar acoustic events such as exploding fireworks, slamming car doors, hammer hits, and motor vehicle backfires. In contrast to the prior art, the present invention takes advantage of a new discovery that rear acoustic detection from a gunshot event provides discrimination information which may be used to improve repeatable discrimination of a gunshot event from other types of high acoustic events such as those listed above. Furthermore, systems of the prior art, are extremely limited in range and may not effectively work at ranges over 100 feet or less.

SUMMARY OF THE INVENTION

In contrast to the prior art, a security system for detecting and reporting gunshot events for control of urban environment security is provided. A communication link is coupled to a plurality of pole units arranged in a dense grid. Each of the plurality of pole units includes a microphone, a data acquisition unit coupled to said microphone, a signal processor for discriminating gunshot events, and a communication interface apparatus coupled at an input to the signal processor. The communication interface also has an output coupled to the communication link, where the communication interface transmits and receives data on the communication link. A central processor is coupled to the communication link so as to receive data from and transmit data to the plurality of pole units. The central processor and the plurality of pole units operate so as to detect and locate gunshot events sensed by one or more of the plurality of pole units.

The security system of the invention provides wide-area coverage of urban environments as opposed to a "point-defense" approach. It can detect and localize gunshots at long range and instantaneously reports gunshot events using state-of-the-art packet radio technology. Additionally, a security system built in accordance with the present invention can accurately discriminate between gunshots and other acoustic events.

Until the present invention, no security system has been provided for permanent installation in a dense grid covering a plurality of city blocks which can detect gunshot events and locate such events using acoustic algorithms for pinpointing the location of the gunshot events. For the first time, the present invention provides a new and different security system capable of classifying and localizing gunfire events over long ranges using acoustic spectral analysis techniques and time domain analysis techniques. Thus, in contrast to the prior art, an entire urban environment can be covered by the acoustic network employed by the invention.

Figure 1:
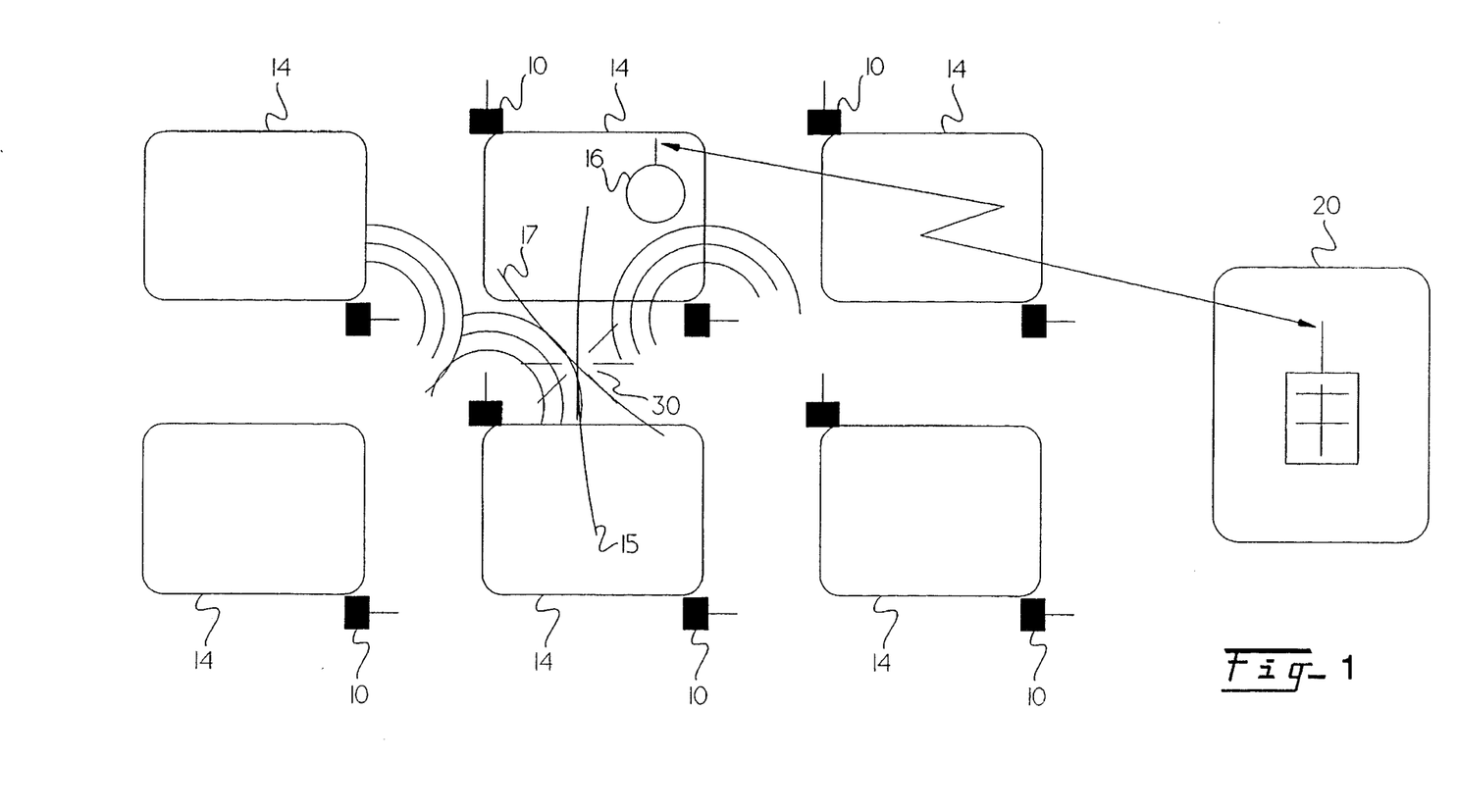
FIG. 1 shows a high level schematic diagram of an urban security system for detecting and locating gunshot events as contemplated by the present invention.

The present invention is comprised of an air-acoustic detection grid composed of distributed sensor modules, called pole units, located at each intersection of a city block thereby forming a dense grid of sensing units. Each pole unit 10, as shown in FIG. 1, has a unique transmit identification code associated with the location of the sensor on the grid. A pole unit 10 may comprise an omni-directional microphone with a bandwidth of 50–14,000 Hz for sensing acoustic energy. An analog-to-digital converter along with signal conditioning circuitry as well as a communications transceiver which remains in "stand by" until detection of an event or status report also may be contained within the pole unit 10. When the system detects the presence of a transient above the background acoustic level, and the transient exceeds a predetermined energy level threshold high speed digital signal processing hardware and software within the sensor module is activated to differentiate gunshot acoustic characteristics from other noise sources. Transmissions from a pole unit may go to a local transceiver node or base station 20 as appropriate.

Upon identification of a gunshot, buffer memory within the pole unit's 10 digital modem will be filled with a time tag, pole unit identification number, and other data necessary for gunshot discrimination, verification and localization. The transceiver may include a digital modem and a VHF digital packet radio that connects through a communications node to report gunfire to a local command center.

One example of a communication system as may be used in one embodiment of the invention is described below by way of illustration and not limitation of the invention. Transmission from the pole units 10 may be, for example, in the VHF band with transmission ranges on the order of a few miles or less. Standard RF mapping procedures may be used to locate the pole units 10 such that complete coverage of a designated area can be obtained, and such that the transmissions from each individual pole unit 10 can reach the node. The local nodes will be located as high as the physical surroundings permit. Multiple node units will be located in an area to provide redundancy. The node units may be configured to automatically retransmit the signal at higher power to the base station at a frequency in the 900 MHz region. The range between a node and the base station can be up to several miles. The base will receive the information sent from the pole unit 10 via the node almost instantaneously, providing rapid detection and localization of the event. Localization of the event will be performed on a central processing computer located at the base station. Other types of transmission means may be employed such as cellular telephone lines and equivalent devices The system concept, called the System for the Effective Control of Urban Environment Security (SECURES), consists of a dense grid of low-cost acoustic sensing and analysis hardware and software coupled to a communications network. SECURES will instantaneously detect, recognize, and pinpoint the location of gunfire in urban environments resulting in reduced emergency response times of up to 85%. Equipped with SECURES, local law enforcement and trauma care resources will be able to respond immediately to gunfire, thereby dramatically increasing both the probability of arresting the gunman and the survivability of the victim.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 8–8B show a schematic flow diagram detailing a method of the invention for discriminating gunshot events from other acoustic events.

DETAILED DESCRIPTION OF THE PREFERRED EMBODIMENT

Referring now to FIG. 1 a high level schematic diagram of an urban security system for detecting and locating gunshot events as contemplated by the present invention is shown. The urban security system includes an acoustic detection grid comprised of distributed sensor modules placed in remote hardware packages, called pole units 10. Pole units 10 may be in communication with local transceiver nodes 16 for relay to a central command center or base station 20. In one embodiment of the invention a pole unit may advantageously be located at intersections, or other locations, of a city block 14 so as to detect gunshot events 30.

In one example embodiment of the invention, time domain differencing techniques may be employed to fix the location of a gunshot event. Using such techniques, the time difference between detection times at more than one pole unit is calculated. The time difference defines a focus of points defining a hyperbola, which intersects the city street thereby fixing the location of a gunshot event at the intersection of the hyperbola and the street. If more than two pole units detect the gunshot event more than two hyperbolas may be defined between pairs of pole units such as hyperbola 17 and hyperbola 15 shown in FIG. 1. In such cases, the gunshot event is fixed at the intersection of the two hyperbolas.

Figure 2:
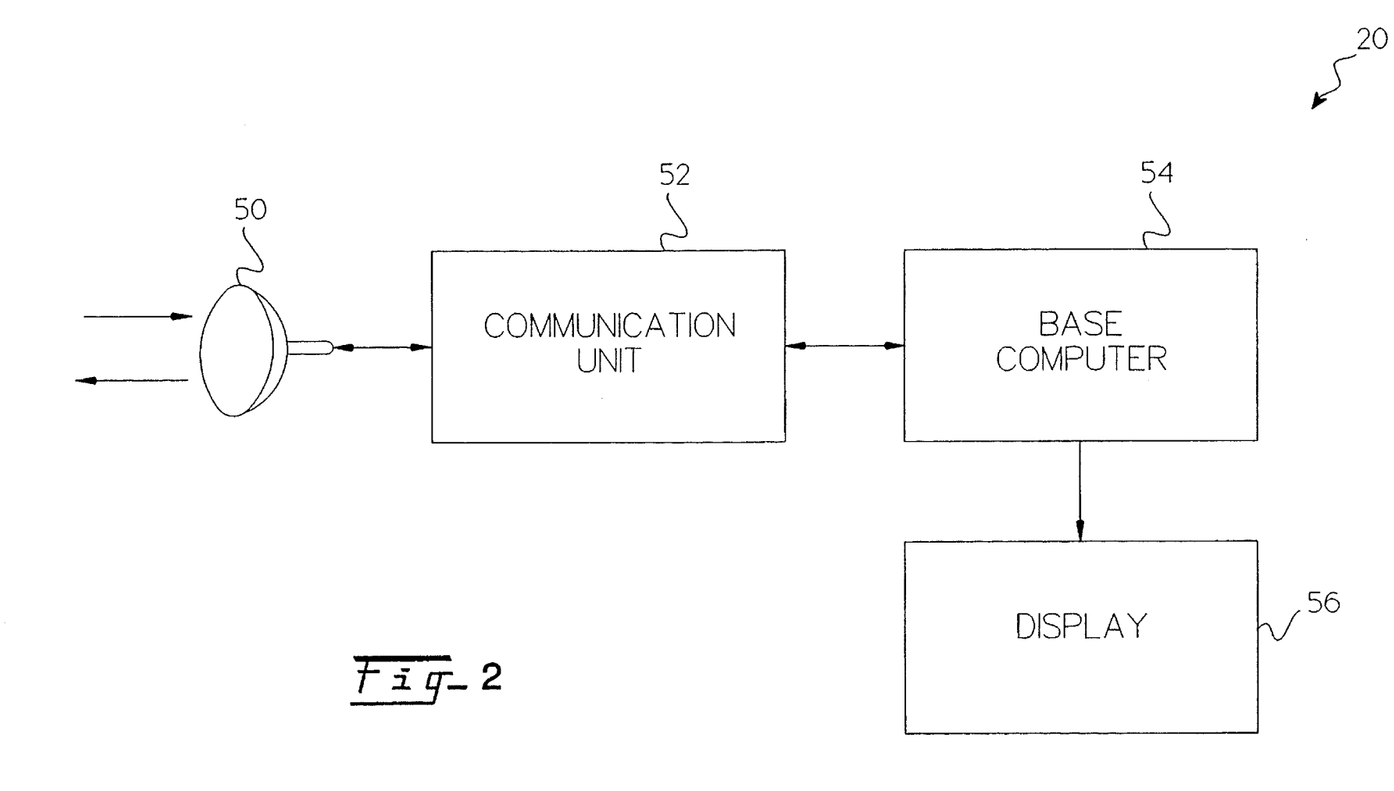
FIG. 2 shows a schematic diagram of a base station as employed in one aspect of an urban security system for detecting and locating gunshot events as contemplated by the present invention.

Now referring to FIG. 2, a schematic diagram of a base station 20 as employed in one aspect of an urban security system for detecting and locating gunshot events as contemplated by the present invention is shown. In one example of the present invention, the base station 20 may comprise an RF antenna 50 coupled to a communication unit 52. Communication unit 52 is coupled to send and receive data from a base computer 54 which advantageously controls a display 56.

Figure 3:
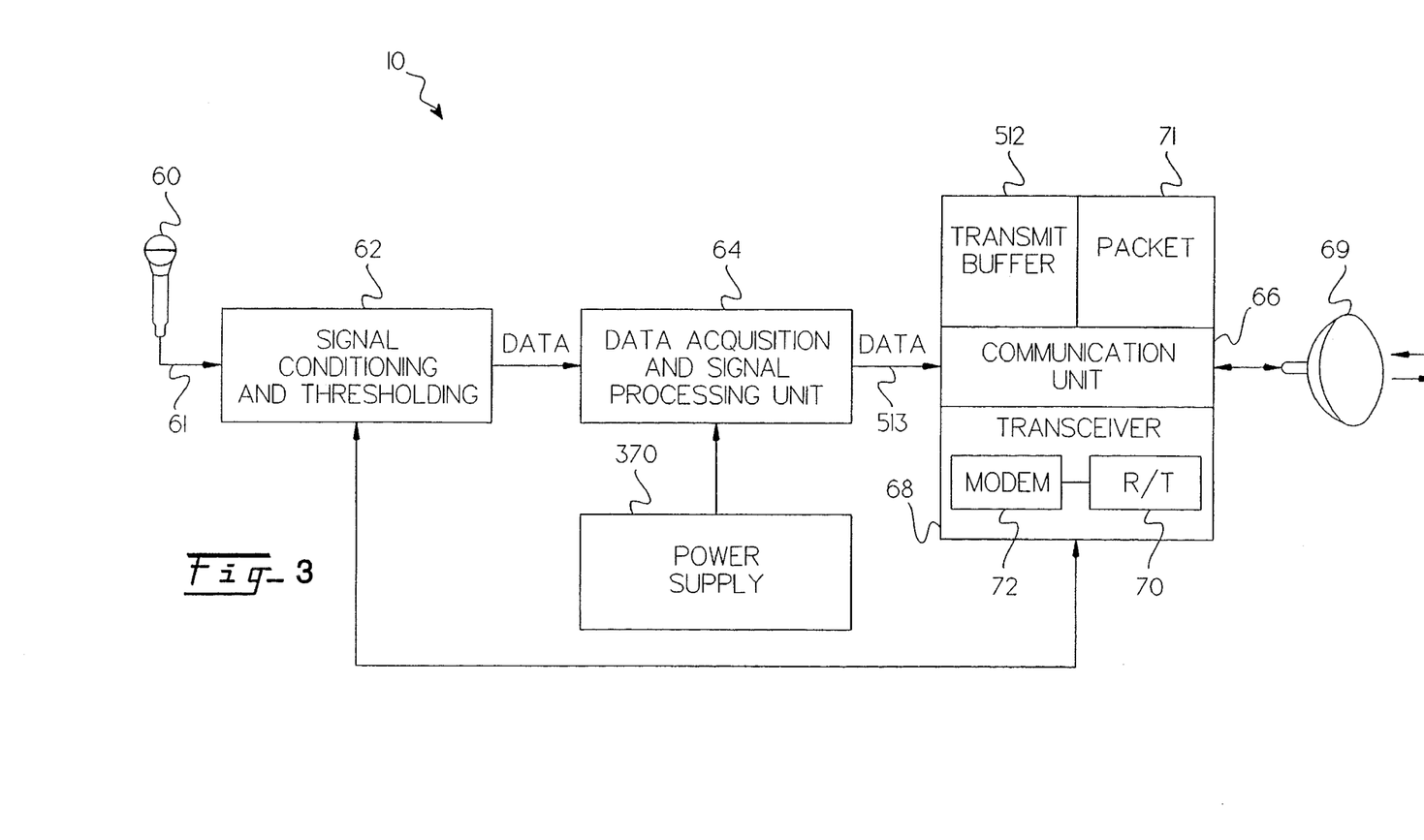
FIG. 3 shows a schematic block diagram of a remote hardware package, herein referred to as a pole unit, as employed in one aspect of an urban security system as contemplated by the present invention.

Now referring to FIG. 3, a schematic block diagram of a remote hardware package, herein also called the pole unit 10, as employed in one aspect of an urban security system as contemplated by the present invention. Each pole unit 10 is comprised of a microphone 60 for sensing acoustic energy, a signal conditioning and threshold unit 62, a data acquisition and signal processing unit 64, a communication unit 66 and a power supply 370. The communication unit 66 may include a transceiver 68 and a transmit buffer 512. The transceiver 68 may advantageously include a digital modem 72 and a VHF digital packet radio transmitter 70 that connects through a communications node, to report a gunfire incident to a local command center which includes the local transceiver node.

In one preferred embodiment, each pole unit 10 may advantageously have a unique transmit identification code indicative of the location of the sensor in the grid. When the presence of a high-intensity transient such as is produced by a gunshot is sensed, high-speed digital signal processing hardware and software within the sensor module differentiates gunshot impulsive transients from other noise sources. In one mode of operation, upon identification of a gunshot event, buffer memory within the pole unit's 10 digital modem may be loaded with a time tag noting the time of the event, pole unit identification number, an acoustic signal and any other data necessary for gunshot verification and localization.

In one embodiment using RF communication, for example, modem buffer data may be formed into digital communications packets and transmitted via VHF radio to local nodes for relay to the base station. At the base station, the data will be unpacked. Data from multiple sensors may be used to perform time-difference fixing to localize the gunfire event within the city block and support additional false alarm discrimination as required.

In one embodiment of the invention, the microphone 60 may comprise an omni-directional microphone with very wide bandwidth response to sense the acoustic energy. Good acoustic response over a band ranging from 50–14,000 Hz may be used in detecting the energy components required for classification of gunshot spectra in the presence of other potential transient false alarms, while still being resilient to the adverse impact of atmospheric absorption on the transmitted energy.

In one example, the data acquisition unit 62 may include an analog-to-digital (A/D) converter, analog amplification and filtering circuitry for signal conditioning. This circuitry, similar to high-fidelity sound recording, may include additional spectral de-emphasis if required.

Note that battery power, as opposed to local service is an optional design alternative. The power supply may use solar cells for primary power and a lead-acid battery for secondary power. In one example, the lead-acid battery may be continuously charged from the solar cells by a trickle charging circuit that supplies a current greater than the average current dissipated by the units. The lead-acid battery, while not the smallest type of battery that can be used, is economical, and has a fairly broad range of operating temperatures. Other, special-purpose battery types may be advantageously used such as lithium cells. Alternative designs such as tapping into local service power may also be used in some examples of the invention.

Figure 4:
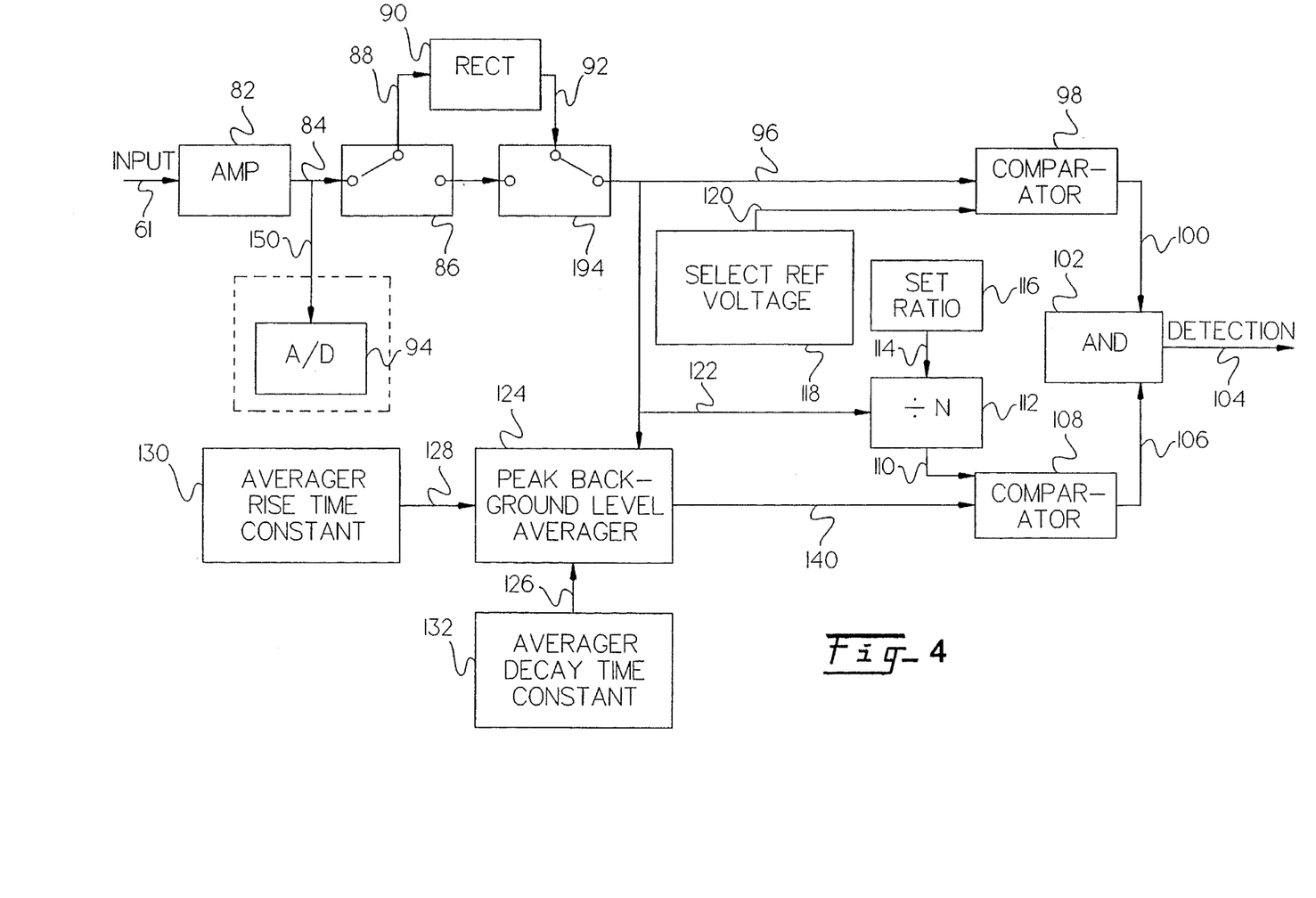
FIG. 4 shows a schematic block diagram of a signal conditioning and threshold unit as employed in one aspect of an urban security system as contemplated by the present invention.

Referring now to FIG. 4, a schematic block diagram of a signal conditioning and threshold unit as may be employed by one embodiment of the invention is shown. The microphone signal on line 61 is passed through an initial variable gain stage or amplifier 82 to adjust the signal to a level appropriate for processing. The adjusted signal is output onto line 84 and then switched through switch 86.

Switch 86 may switch the amplified signal through to switch 194 which may be in a position to pass the signal through on line 96 to comparator 98. Optionally, a rectifier 90 may be employed. If the rectifier is used the signal may optionally be routed by switch 86 onto line 88 through the rectifier 90 which passes the rectified signal through to line 92 and subsequently through switch 194. Use of rectifier 90 may be helpful if needed for optimizing peak detection by a peak background level averager shown here as peak background level averager 124. The signal is subsequently passed on line 96 to comparator 98 where it is compared to a selective reference voltage which is set to trigger the comparator for transients greater than a preselected level, e.g., 100 decibels. Comparator 98 provides a detection output 100 into AND logic 102. Also included in the signal conditioning and threshold unit are an averager rise time constant circuit 130 connected by line 128 to the peak background level averager 124 together with an averager decay time constant circuit 132 which is also connected to the peak background level averager 124 through line 126. The peak background level averager outputs a peak background level signal on line 140 to a second comparator 108. The second comparator 108 also receives a reference signal on line 110 from divider 112 which receives the amplified signal on line 122 and has its ratio N set by unit 116 through line 114. In operation, the averager rise time constant and averager decay time constant operate together with the peak background level averager in order to provide a peak background average signal in a dynamic fashion. In one example, the peak background averager comprises a peak detector having a decay time constant of about 100 ms. As background transients create peak signals above the current average background level, the peak averager rises to the higher level and begins to decay resulting in a saw tooth-like output. The output is then fed to a low pass filter having a rise time constant of about 3 ms. Thus, since a gunshot occurs in about 1 ms, gunshot events will stand above the average background level and not be tracked by the peak detector. The 3 millisecond time constant is thus customized to pass a gunshot event.

In one example of the invention, the averager rise time constant may be about 3 msec while the averager decay time constant may be about 100 msec. The peak background level averager applies the rise time constant and decay time constant to acoustic signals from loud background events such as busses or fire engines passing a pole unit, for example. Keeping such a running background average noise level allows the signal conditioning and threshold unit to discriminate such transient background events from candidate gunshot events. In one example of the invention, the ratio N may be set to a magnitude of about 5, for example, so that if the new event is 5 times louder than the average event, it will cause the comparator to trigger a signal on line 106 into a second input of the AND logic 102. In operation, if the signal has a peak above the reference signal on line 110, comparator 108 will trigger and if the signal exceeds the minimum reference voltage set in circuit 118, comparator 98 will also trigger, thus yielding a detection pulse from AND logic 102 on line 104. The detection pulse is used to activate downstream processors and circuits.

An amplified signal on line 150 is also provided to analog-to-digital converter 94 where it may be converted into a digital format using, for example, 16 bit A/D converted sampling at a rate appropriate for the frequency response of the microphone 60. A high sampling rate may be used to obtain sufficient samples for spectral analysis of the rise time of an explosive transient wave form caused by a gunshot. Sixteen bits of analog quantization provides approximately 14 bits of accuracy under typical operating conditions. Such a design has approximately 84 dB of dynamic range.

Figure 5:
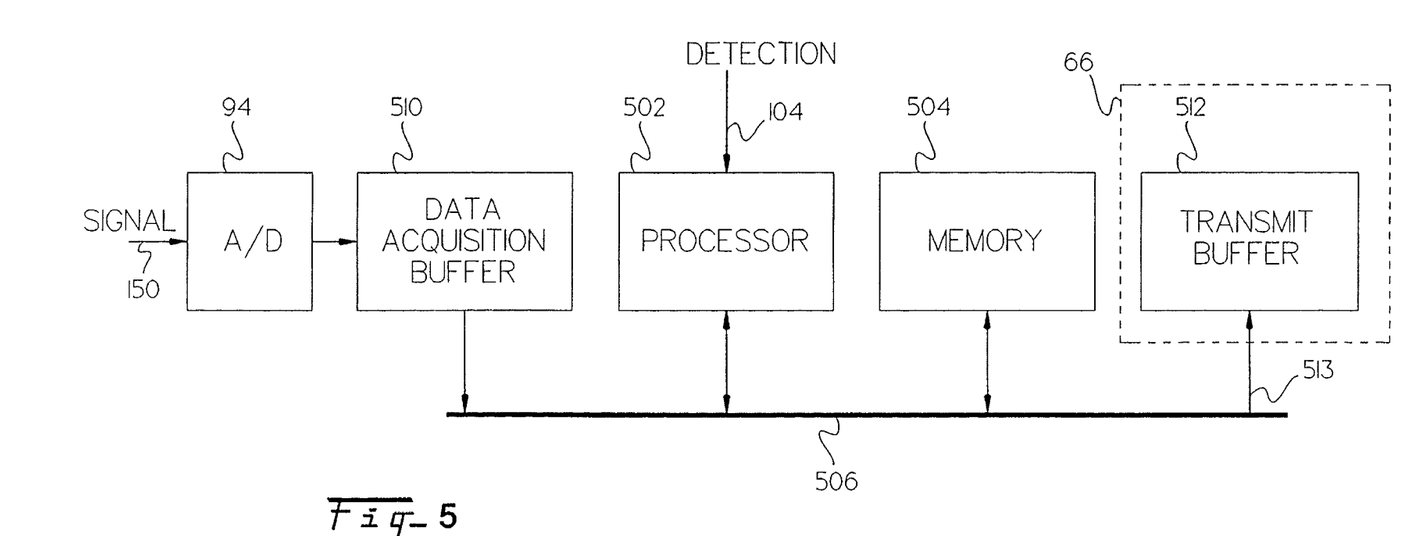
FIG. 5 shows a schematic block diagram of a data acquisition and signal processing unit as employed in one aspect of an urban security system as contemplated by the present invention.

Referring now to FIG. 5, a schematic block diagram of a data acquisition and signal processing unit 64 as employed by one example embodiment of the invention is shown. The data acquisition and signal processing unit remains in a powered down "stand-by" mode to conserve energy until a detection signal is received on line 104. The system of the invention generally is activated on an incremental basis to conserve energy. Only those circuits needed for processing are energized on an as needed basis. The data acquisition and signal processing unit 64 advantageously comprises analog-to-digital convertor, a processor 502, associated memory 504 and bus 506. In operation, the processor 502 receives data from the signal conditioning and thresholding unit 62 and processes it to detect and classify the transient events of interest. Data acquisition buffers 510 in the unit allow the processor 502 to continue processing while new input data is being received from the signal conditioning and thresholding unit 62, and detection data is being sent to the communications unit 66 on line 513. The processor's program may be stored in memory 504. Memory 504 may advantageously comprise a non-volatile memory device that retains information in the event of a power failure.

In one embodiment of the invention, digitized microphone data is passed to the processor 502 via the multi-port data acquisition buffer 510 that is mapped into the processor memory space. The processor 502 processes the data to detect transients and to classify them as gunfire or non-gunshot events. Upon a decision of positive classification, data is placed into a transmit buffer 512 of the communications unit 66. In one embodiment, one example of a useful processor is a DSP chip which may be a TI Model TMS320C31™ 32 bit floating point processor rated at 33 MFLOPS or a TI Model TM5320C25™.

Classification of transient events from gunshots may be performed using a variety of signal processing techniques, as appropriate. Such techniques may include energy estimation, transient shape analysis, rise-time derivation, spectral analysis, time domain analysis and replica correlation. State-of-the-art classification algorithms such as Bayes algorithm, nearest neighbor algorithms, and neural networks that operate over these feature sets may be applied as appropriate. In addition, post processing techniques that restore high frequency components suppressed by atmosphere absorption have been devised to improve probability of correct classification.

The apparatus and method of the invention contemplate that all discrimination analysis or a portion of the discrimination analysis including the classification of transient events may be done in a host computer located at the base station. The host computer will have information from all pole units reporting the same event and may be able to incorporate that information into making a decision as to whether or not to report a certain event. The host computer may also receive detected acoustic signal waveforms from the pole units and be able to process those waveforms directly. In one example of the invention, it is contemplated that the host computer may be connected to an audio speaker for replay of the acoustic event through the speaker so that a dispatcher at the base station may hear the event and make a decision based upon the audio playback.

Referring again to FIG. 3, the communications unit 66 may comprise an antenna 69, a transmit buffer 512, a transceiver 70, a packet box 71, and a power supply. The antenna 69 may advantageously be a helical all-weather resonant flexible unit designed for operation in the 900 MHz band. It may be attached to the pole unit 10, Node, and Base units using a waterproof connector.

In one embodiment of the invention, the transceiver may be a crystal controlled transceiver. Alternatively, a spread spectrum, FSK or frequency synthesized transceiver may be used. An example of a crystal controlled transceiver is the MAXON DM-0500™ series of Telemetry/Data module radios. An example of a frequency synthesized receiver is the MOTOROLA RNet Telemetry Radio™ series.

The packet box 71, sometimes called a Terminal Node Controller (TNC) is available from several manufacturers, including Kamtronics, HAL Communications, or AEA. Any standard TNC already has the majority of the characteristics required for SECURES. Special firmware will be required for any selected TNC. The TCP/IP protocol will be installed, and a special circuit will be added which will not allow any node changes. When the radio is powered up, the TNC will automatically be in the CONVERSE mode, with the TCP/IP networking capability operational, and not revert to the COMMAND mode which is the standard TNC architecture. The TNC may be about the size of typical cigarette package.

Figure 6:
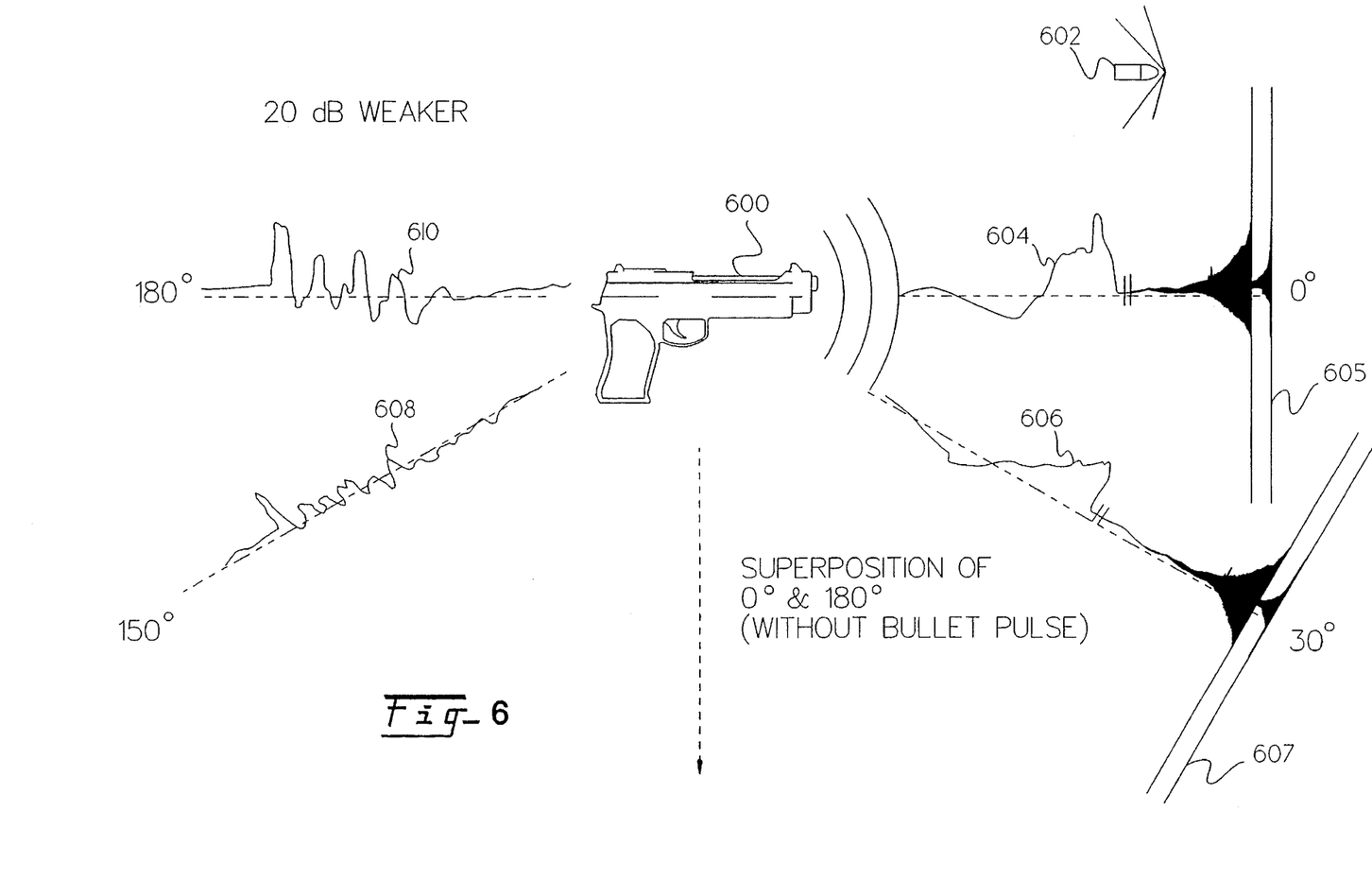
FIG. 6 shows schematically a comparison of shock pulses and acoustic waveforms as detected from a handgun as measured from varying angles.

Referring now to FIG. 6, differences in acoustic waveforms as measured from various angles are generally illustrated. A gun 600 having fired a bullet 602 is shown together with waveforms 604, 606, 608 and 610. It has now been discovered that, in contrast to the approaches taken by the prior art, gunshot signatures of a uni-directional source such as a handgun 600 may be discriminated from other events using rear acoustic detection. A bullet 602 generates a shock pulse 605, 607 as measured from the front and accompanied by a gas generated shock pulse from the gun itself in the front as measured from the front of the gun as shown in waveforms 604 and 606. Waveforms 604 represents a gas generated shock pulse as measured along an axis which is displaced 0 degrees from the axis of the gun barrel. Waveform 606 shows another measured gas generated shock pulse as measured at an angle of about 30° from the axis passing through and along the gun barrel of gun 600. Contrast those waveforms with the waveforms measured from the rear of the gun 600, namely rear acoustic detection signals 608 and 610.

Waveform 608 represents a waveform as measured at an angle of about 150° as referenced to the axis passing to the front of the gun barrel and waveform 610 is measured at about 180° or directly rearwardly of the front of the gun barrel. Note that waveforms 608 and 610 display a pattern of peaks or oscillations, not displayed in the gas generated shock pulses measured generally from the front of the fired gun 600. In addition to features derived from the waveform, the present invention exploits this newly discovered phenomenon in order to build a discrimination method for differentiating gunshot events from other non gunshot events such as firecrackers exploding, balloon pops, etc.

Figure 7A:
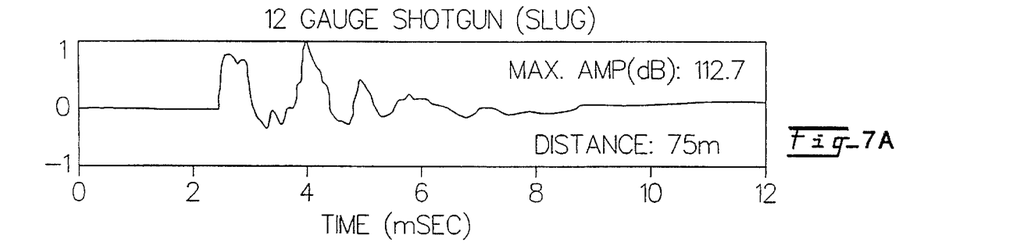
FIGS. 7A–7E show waveforms representative of rear acoustic detection for various weapons.
Figure 7B:
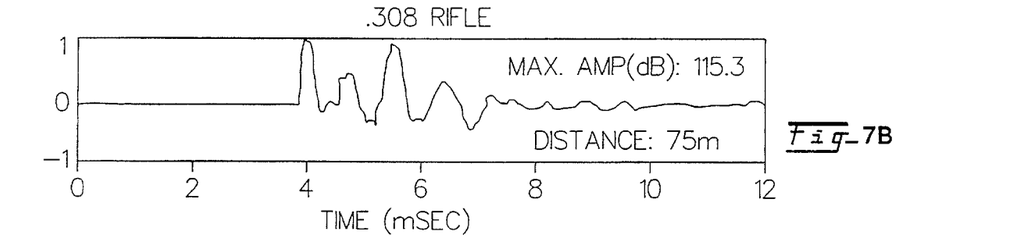
Figure 7C:
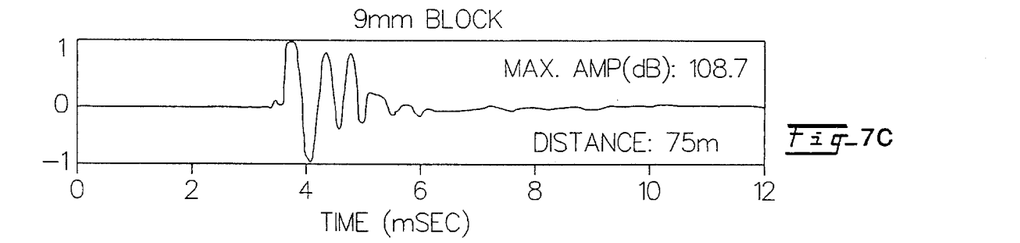
Figure 7D:
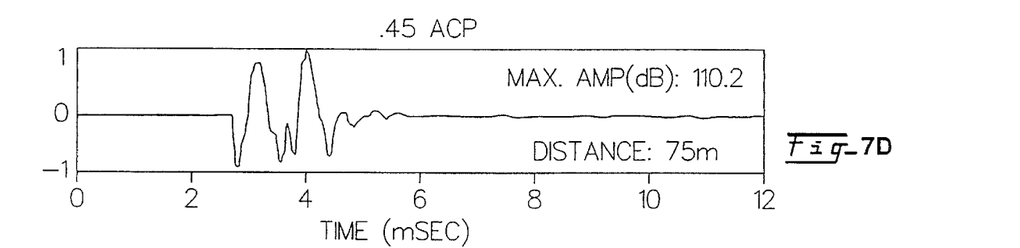
Figure 7E:
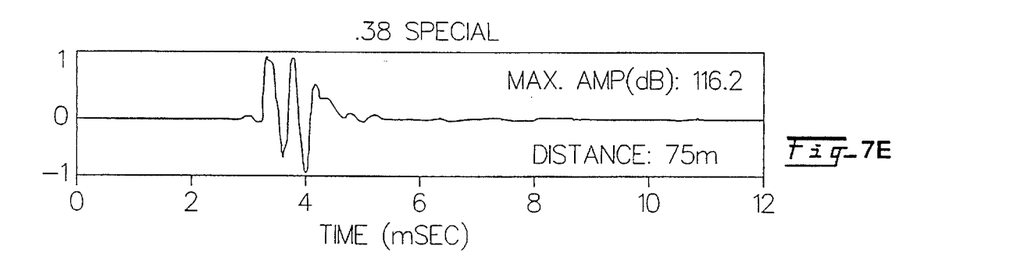

Referring now to FIG. 7A–7E, a number of waveforms measured using the rear acoustic detection method of the invention are shown for various firearm types. The waveform data for each type of weapon was measured from a distance of about 75 meters. FIG. 7A shows a rear acoustic detection waveform for a 12 gauge shotgun. FIG. 7B shows a rear acoustic detection waveform for a 0.308 rifle. FIG. 7C shows a rear acoustic detection waveform from a 9 mm block. FIG. 7D shows a rear acoustic detection waveform from a 0.45 acp. FIG. 7E shows a rear acoustic detection waveform from a 0.38 special. Such waveforms may be held in memory in digital form for comparison with detected signals.

Gunshot signatures observed behind a gun have characteristics that distinguish short and long barrel weapons and possibly classes of short and long barrel weapons. This signature is dominant when observed behind the gun, but is superimposed on the acoustic pulse observed in the forward direction too. In the illustrated case, it represents a relatively small fraction of the total acoustic energy. The signature may be extracted by pattern recognition methods to allow gun classification to be effective for most observation angles.

Figures 8, 8A:
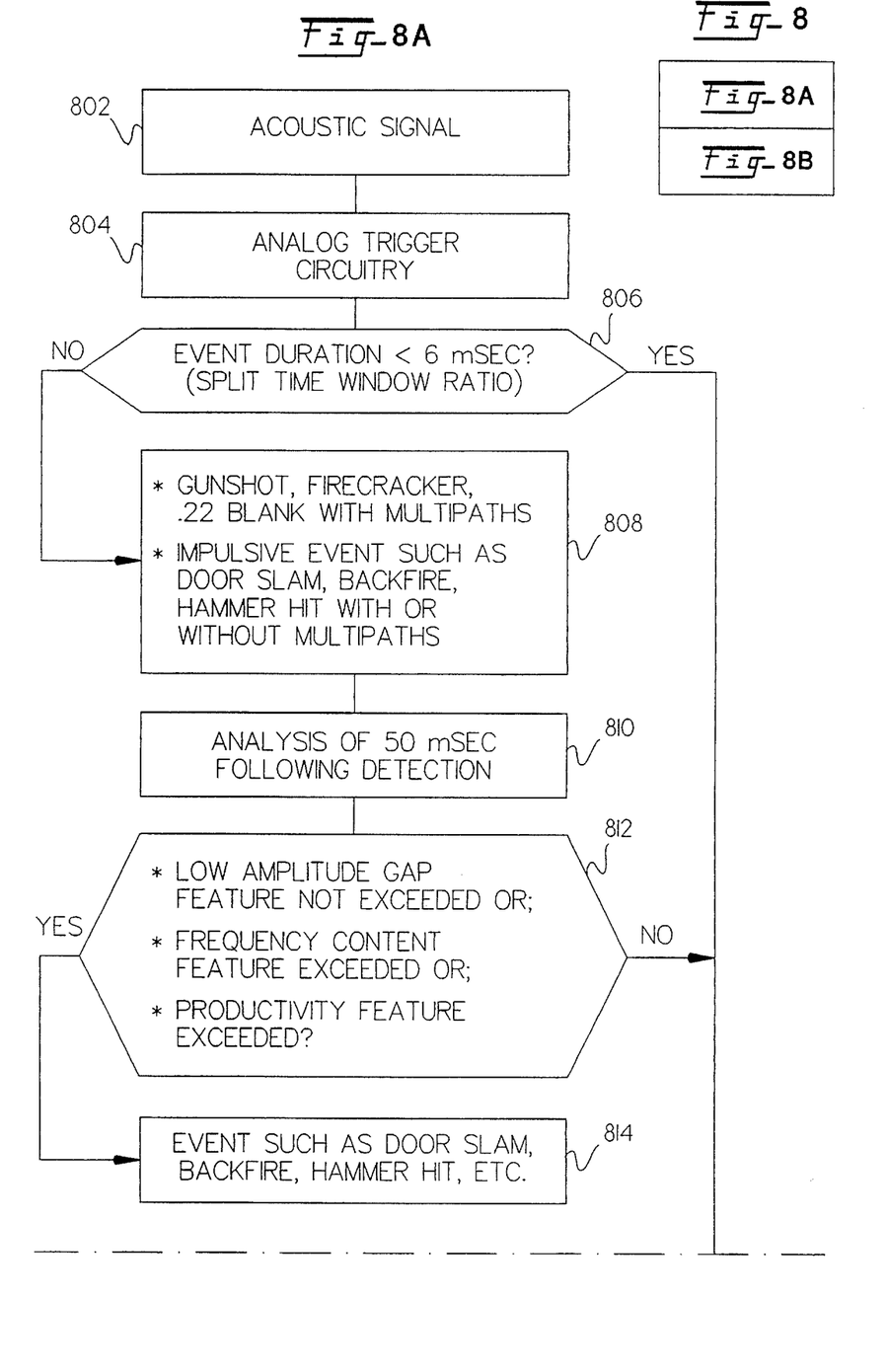
Figure 8B:
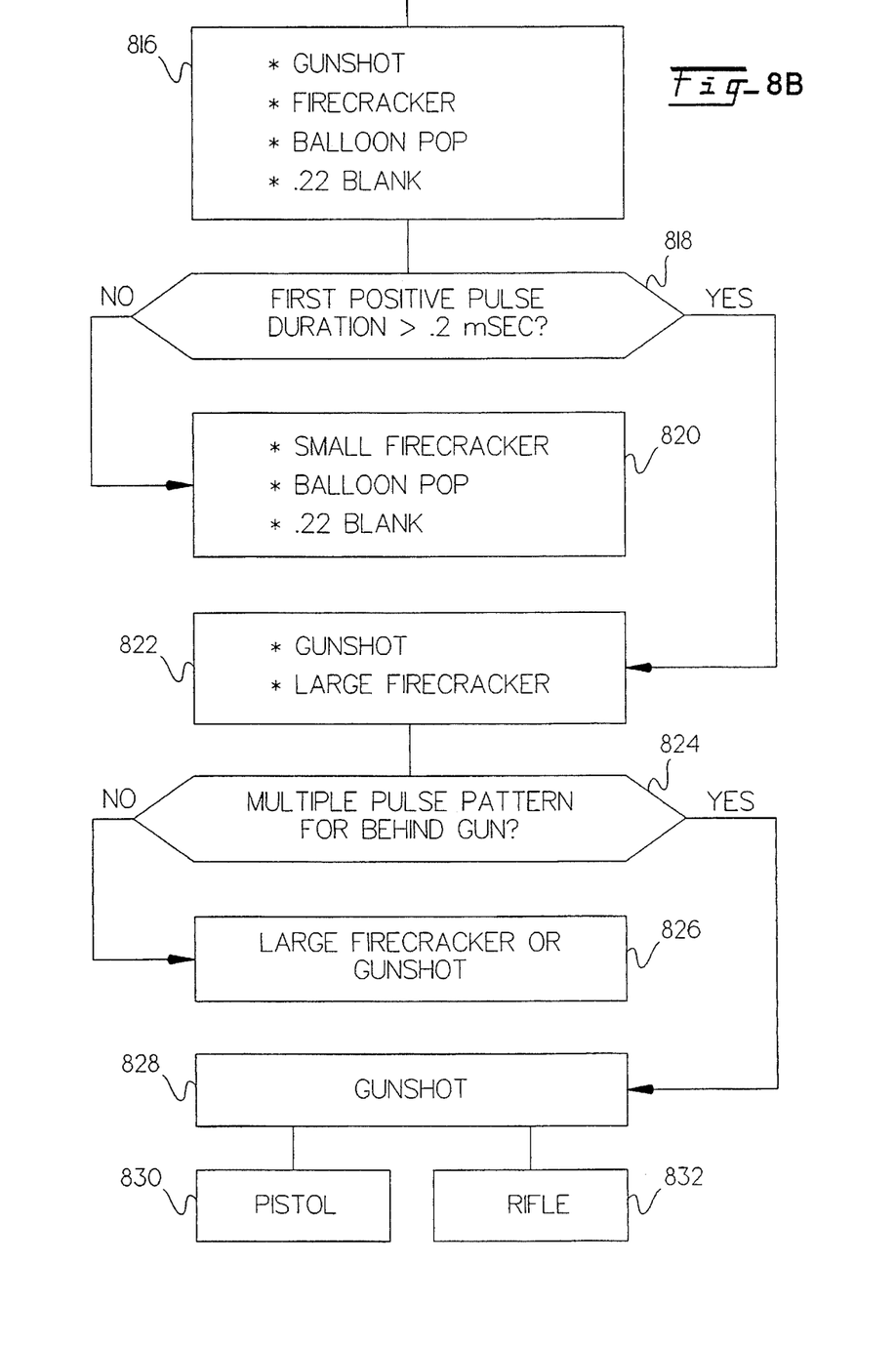

Referring now to FIG. 8, a flow diagram of the method of the invention for discriminating gunshot events from other acoustic events is shown. It is not necessary for all of this analysis to be performed in the pole unit. It may be done in the host computer. The only requirement is that the pole unit discriminator is effective enough to minimize RF transmission and to extend battery life.

At process step 802, an acoustic signal is measured. The acoustic signal is introduced into the analog trigger circuitry comprising the signal conditioning and thresholding unit 62 at process step 804. If the signal conditioning and thresholding unit outputs a detection signal, the event duration is measured at process step 806. If the event duration is not less than a first predetermined time period, for example, about 6 milliseconds, the process is routed to process step 808. If the event duration is less than the first predetermined time period, the process flows to process step 816.

Block 808 represents a state wherein further analysis is required to determine whether the acoustic event was a gunshot, a fire cracker, or 0.22 blank with multipaths as opposed to an impulsive event such as a door slam, backfire, or hammer hit with or without multiple paths. The process then proceeds to step 810 wherein an analysis of a second predetermined time period, for example, a 50 msec time period following detection of the event is initiated. At process step 812 the analysis of the signal detected during the second predetermined time period is carried out. Three feature analysis methods are applied to the waveform within the second predetermined time period following detection.

The majority of impulse events from which to discriminate gunshots have characteristics of a mechanical system associated with them that resonates. For example, in hitting metal hammers together, sharp acoustic impulses are generated with rise times comparable to gunshots, but the hammer resonates for a period of time significantly longer than the duration of a gunshot. However, in the case where a gunshot is fired among buildings or other obstacles, multiple echoes may follow the direct transmission of the signal to the microphone. In such a case, analysis is required to distinguish a gunshot with echoes from another source with longer duration. The following three methods may be used to process the waveform:

Low Amplitude Gap Feature: This analysis keys on the fact that echoes arrive from a limited number of discrete paths within about the first 50 msec, for example, of the detection. Echoes, unlike other noise sources, will have gaps between these arrivals. The gap feature is a statistical measure of the number and duration of such gaps.

Frequency Content Feature: This feature is a measure of the percent of the waveform that is above a predetermined frequency and is a good discriminator for impulsive events such as metal clanks, backfires, hood slams and glass breakage.

Periodicity Feature: Most noise sources have a dominant resonant frequency or repetitious nature. Detection of a dominant frequency and its harmonics is a good discriminator for events such as metal clanks, hood slams, backfires, sirens, etc.

If the feature methods rule out a gunshot event at process step 812, the process flows to process step 814 where the event is classified as a non gunshot event.

If the features do not rule out a gunshot event, the process flows to block 816, where a distinction is made between a gunshot, firecracker, balloon pops or 0.22 blank without multiple paths. Block 816 may also be entered via step 806 as discussed above. A decision must be made between the choices delineated in block 816. The process flows to step 818 where a first deposit of pulse duration of greater than a third predetermined time period, for example, 0.2 msec, is measured. If no first positive pulse duration of greater than the third predetermined time period is detected, the process flows to step 820 where the acoustic event is classified as a small fire cracker, balloon pop, 0.22 blank or other non-gunshot event. If the measurement at process step 818 proves greater than the third predetermined time period, the process flows to process step 822 wherein a discrimination must be made between a gunshot and a large firecracker, such as an "M80". To discriminate between a gunshot and a large firecracker the process flows to step 824 where a multiple pulse pattern from a signal taken from behind a gun is compared to the detected signal. If the multiple pulse pattern compares within preselected tolerance levels against preselected patterns such as those shown in FIG. 7A–7E, the process flows to step 828 where it is classified as a gunshot. Depending upon pattern matching of various stored gunshot patterns, such as shown in FIG. 7A–7E, the gunshot may further be classified into a weapon type such as a pistol 830 or a rifle at step 832. If the pattern of the detected gunshot signal does not compare within preselected tolerance ranges with the stored rear acoustic detection patterns, the acoustic event will be classified as a large firecracker or a gunshot.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A security system for detecting a gunshot event comprising:

(a) a communication link;

(b) a plurality of pole units arranged in a dense grid, wherein each one of the plurality of pole units includes, (i) a microphone, (ii) an amplifier coupled to the microphone for receiving an acoustic signal from the microphone, the amplifier having an amplified output for carrying an amplified acoustic signal, (iii) a first comparator having a first input coupled to the amplified output, (iv) a reference signal coupled to a second input of the first comparator wherein the first comparator outputs a detection signal if the amplified output exceeds the reference signal, (v) a peak background level averager having a first input connected to receive the amplified acoustic signal and having a peak background level averager output, (vi) a divider having an input coupled to receive the amplified acoustic signal and having an output whereon a signal proportional to the amplified acoustic signal is impressed, (vii) a second comparator having a first input connected to the peak background level averager output and a second input coupled to the output of the divider wherein the second comparator outputs a detection signal on a second comparator output where the proportional signal exceeds the peak background level averager signal, (viii) logic for ANDING the first comparator output and the second comparator output so as to output a detection signal if both outputs indicate a candidate gunshot event has occurred, (iv) a data acquisition and signal processing unit for discriminating gunshot events, and (x) a communication interface coupled at an input to the data acquisition and signal processing unit, the communication interface also having an output coupled to the communication link, where the communication interface transmits and receives data on the communication link; and (c) a central processor coupled to the communication link so as to receive data from the plurality of pole units where the central processor and the plurality of pole units operate so as to detect and locate gunshot events sensed by one or more of the plurality of pole units.

2. The security system of claim 1 wherein the communication interface comprises a modem and a receiver/transmitter coupled to the communication link.

3. The security system of claim 1 wherein the central processor is coupled to communication links from the plurality of pole units so as to perform time-difference fixing to localize a gunshot event within a city block and support additional false alarm discrimination.

4. A method for discriminating and reporting a gunshot event from an acoustic signal comprising the steps of:

(a) detecting an acoustic signal;

(b) providing a detection pulse when the acoustic signal exceeds a predetermined transient minimum amplitude;

(c) determining whether the acoustic signal exhibits an event duration less than a first predetermined time period;

(d) if the event duration is not less than the first predetermined time period, then analyzing a portion of the acoustic signal within a second predetermined time period following detection of the acoustic signal, including the steps of:

(i) determining whether a low amplitude gap feature exceeds a predetermined value, wherein the low amplitude gap feature comprises a statistical measure of a number and duration of gaps in the acoustic signal, (ii) determining whether a frequency content feature exceeds a predetermined value, wherein the frequency content feature comprises a measure of a percentage of the acoustic signal above a predetermined frequency, or (iii) determining whether a periodicity feature exceeds a predetermined value, wherein the periodicity feature comprises a measure of a dominant resonant frequency, and (iv) if the low amplitude gap feature or the frequency content feature or the productivity feature are positive determinations then classifying the event as a non-gunshot event;

(e) if the event duration is less than the first predetermined time period, then measuring whether a first positive pulse in the acoustic signal is greater than a third predetermined time period;

(f) if the first positive pulse duration is less than the third predetermined time period classifying the acoustic signal as a non-gunshot event; and (g) if the first positive pulse duration is greater than the third predetermined time period then classifying the acoustic signal as a gunshot or larger firework event.

5. The method of claim 4 further comprising the step of comparing a multiple pulse pattern for the acoustic event with stored rear acoustic detection signals to determine whether the acoustic event is a gunshot event.

6. The method of claim 4 further comprising the step of analyzing the acoustic event using energy estimation techniques so as to determine whether it is a gunshot event.

7. The method of claim 4 further comprising the step of analyzing the acoustic event using transient shape analysis techniques so as to determine whether it is a gunshot event.

8. The method of claim 4 further comprising the step of analyzing the acoustic event using rise time duration techniques so as to determine whether it is a gunshot event.

9. The method of claim 4 further comprising the step of comparing the acoustic event using high frequency spectral analysis and replica correlation techniques so as to determine whether it is a gunshot event.

10. The method of claim 4 further comprising the step of analyzing the acoustic event using bayes techniques so as to determine whether it is a gunshot event.

11. The method of claim 4 further comprising the step of analyzing the acoustic event in accordance with nearest neighbor techniques so as to determine whether it is a gunshot event.

12. The method of claim 4 further comprising the step of comparing the acoustic event in accordance with neural network techniques so as to determine whether it is a gunshot event.

* * * * *